UNITED STATES PATENT OFFICE.

HORACE L. WELLS, OF NEW HAVEN, CONNECTICUT.

RECOVERING HYDROCHLORIC ACID FROM NICKEL-CHLORID SOLUTION.

940,293.  Specification of Letters Patent.  Patented Nov. 16, 1909.

No Drawing.  Application filed May 4, 1909.  Serial No. 493,970.

*To all whom it may concern:*

Be it known that I, HORACE L. WELLS, a citizen of the United States, residing at New Haven, in the county of New Haven and State of Connecticut, have invented a new and useful Improved Method of Recovering Hydrochloric Acid from Nickel-Chlorid Solution.

My invention relates to an improved method of recovering the hydrochloric acid from the nickel chlorid solution resulting from the treatment of rich copper-nickel matte with hydrochloric acid for the separation of the nickel and copper from the matte in accordance with the method set forth in my pending application filed February 19, 1909, Serial No. 478,878, the object being to economically recover the hydrochloric acid from the resulting nickel chlorid solution so that the hydrochloric acid may be used over and over again in the treatment of matte.

Before proceeding to the description of the method forming my present invention, it may be well to state that the method forming the subject of my prior application consists in pulverizing the matte and agitating it with heated hydrochloric acid solution, and then progressively treating the resulting solution and its derivatives with hydrochloric acid solution and its acid liquid derivatives.

In carrying out my present invention for recovering the hydrochloric acid from the nickel chlorid solution resulting from the prosecution of the method above referred to, I add to the nickel chlorid solution sulfuric acid and ammonium sulfate in amounts calculated to correspond to the amount of nickel present in the nickel chlorid solution, or preferably somewhat more than that amount, and dissolve the ammonium sulfate in the sulfuric acid before adding these chemicals to the liquid. The mixture is allowed to stand for some time and to become cool. The greater part of the nickel will be precipitated in the form of nickel-ammonium sulfate, a salt much used in the process of electro-plating nickeled goods. The solution separated from this precipitate contains hydrochloric acid corresponding to the nickel chlorid that has been changed to sulfate, together with the constituents of a small amount of nickel-ammonium sulfate remaining dissolved in the liquid, and any excess of ammonium sulfate and sulfuric acid that may have been added over the amount required to form the double salt. This acid liquid can then be used for the treatment of matte according to the method already described. The small amounts of ammonium sulfate and nickel sulfate present in this liquid do not interfere with this process, as they pass through it practically unchanged and are ultimately recovered. A considerable amount of sulfuric acid, which may be added intentionally to this liquid as an excess over the calculated amount, or which may accumulate from small increments by using the liquid over and over again in this process, will not interfere with this process, since such mixtures of hydrochloric acid and sulfuric acid act upon matte with the formation of nickel chlorid and nickel sulfate, and yield a solution very suitable for the precipitation of ammonium-nickel sulfate as herein described.

I claim:—

The herein described method of recovering hydrochloric acid from the nickel chlorid solution produced by treating a matte containing nickel and copper sulfids with hydrochloric acid, in order that the recovered hydrochloric acid may be used again in treating such matte, which method consists in adding to the nickel chlorid solution the proper quantity of sulfuric acid and ammonium sulfate to form with the nickel chlorid present, the sparingly soluble salt known as nickel-ammonium sulfate, and separating the liquid from the resulting precipitate.

In testimony whereof, I have signed this specification in the presence of two subscribing witnesses.

HORACE L. WELLS.

Witnesses:
FREDERIC C. EARLE,
CLARA L. WEED.